UNITED STATES PATENT OFFICE 2,523,977

DRILLING FLUIDS

Cary R. Wagner, Utica, Ohio, and William N. Axe, Bartlesville, Okla., assignors to Phillips Petroleum Company, a corporation of Delaware No Drawing. Application November 5, 1945, Serial No. 626,896

6 Claims. (Cl. 252—8.5)

This invention relates to drilling fluids. In one of its more specific aspects, it relates to a drilling fluid comprising solutions of celluloses which are not precipitated nor regenerated in any substantial degree by dilution with water and/or the usual dilute salt containing connate water of an oil well formation nor by the heat or cold generally obtainable in a well. In another specific aspect, it relates to a drilling fluid comprising a stabilized cellulose xanthate or stabilized cellulose xanthate derivative; and to the methods of use of such celluloses for controlling viscosity, gel strength, water loss and filter cake thickness of oil well drilling fluids.

In the art of drilling wells, especially drilling wells by the rotary method, it is necessary to use a drilling mud or drilling fluid, as is well understood in the art. The drilling mud lubricates the drill stem, carries the cuttings to the surface of the well, cools the drill bit, and forms a filter cake on the walls of the well preventing loss of at least any substantial amount of water from the drilling mud to the natural formations of the well. In order to perform these important functions properly, the drilling mud must have suitable viscosity and other qualities at all times.

The principal object of our invention is to produce a drilling mud which can be used in substantially all formations with reduced water loss, thin filter cake, and proper viscosity and gel strength.

Another object is to provide an improved drilling fluid.

Another object is to provide an improved method of drilling.

Another object is to provide drilling mud additives suitable for providing proper viscosity, gel strength, water and filter cake thickness of well drilling fluids.

Another object is to provide a drilling mud containing a soluble cellulose which is not precipitated nor regenerated in any substantial degree by dilution with water and/or connate water, such as a suitable stabilized cellulose xanthate or stabilized cellulose xanthate derivative.

Numerous other objects and advantages of this invention will be apparent to those skilled in the art upon reading the accompanying specification and claims.

In the present invention we prefer to employ as a colloidal suspending or dispersing agent in a drilling mud a soluble cellulose such as a stabilized cellulose xanthate. The term "xanthate" includes all compounds which may be regarded structurally as being salts or esters of xanthogenic acid, or of dithiocarbonic acid, or of xanthic acid. They are characterized by the typical xanthate linkage:

Such a stabilized cellulose is not precipitated or regenerated by dilution with water and/or the usual salt containing connate water. Nor is it precipitated by heat or cold generally obtainable in a well, or regenerated during use as a drilling fluid by aging or ripening as it is a substantially stable substance for a relatively long period of time. Substances which precipitate or regenerate under the above conditions we find are not suitable for use in drilling mud, although they may find some use as plugging agents for plugging wells, and, therefore, are not related to the present invention. Such plugging agents would soon precipitate and fill the mud pit and also choke the drill stem in the hole.

The amount of said soluble cellulose employed is not critical as even small amounts give a corresponding smaller effect.

Cellulose xanthates may be prepared by reacting carbon disulfide with an alkali cellulose. The alkali involved may be sodium, potassium, lithium, caesium, rubidium or ammonium. Obviously, the cheaper commercial alkalis are employed for economy. With sodium, sodium cellulose xanthate is formed, which is considered to have the formula:

Cellulose xanthates are known also as viscose. Cellulose xanthate is decomposed into its original components in the presence of acids. In alkaline solutions it is relatively stable, but undergoes a combination of hydrolytic and oxidation reactions termed "ripening" whereby cellulose is eventually regenerated. This type of regeneration which is greatly accelerated in the presence of salt solutions has been recommended for plugging oil well formations. However, fresh viscose is an active lyophyllic colloidal and is of value as a stabilizing or protective colloid in drilling mud compositions when suitably stabilized against the ripening reactions.

A simplified ripening equilibrium may be represented as follows:

Xanthated alkali cellulose=

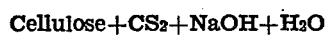

$Cellulose + CS_2 + NaOH + H_2O$

The above system is continually disturbed by the elimination of $CS_2$ by oxidation to thiocarbonate. By modifying the above system in such a way as to prevent the shift toward the decomposition reaction, a relatively stable colloidal system can be realized. Thus it is known that increasing the NaOH content is a step in the right direction since this favors the formation of fresh cellulosate groups to react with $CS_2$ which tends to drive the reaction to the left. The addition of fresh $CS_2$ will also slow down decomposition, but this is not desirable in drilling mud practice. Since the taking up of oxygen by the system occurs during ripening, the field is open for the use of inhibitors to prepare a stable system. It is well known that sodium sulfite and certain iron salts greatly retard the decomposition or ripening of viscose. It is now proposed to incorporate minor quantities of such oxidation inhibitors as ferrous sulfate, catechol, pyrogallol, certain aminophenols, such as ortho para and meta aminophenols, mercaptans such as methyl, ethyl and propyl mercaptans and other well known oxidation inhibitors into drilling muds containing cellulose xanthate colloids. In general, it is believed that the ripening phenomenon of viscose will not be an insurmountable problem in the concentrations involved in drilling muds.

Some of the characteristics of cellulose xanthate (viscose) are listed herewith. It will be noted that in many points this material parallels the behavior of colloidal drilling mud systems.

1. Cellulose xanthate forms typical colloidal solutions.

2. Normal "ripening" periods for viscose range from 10–14 days and with 6 to 15% sodium hydroxide added the stability of an aqueous xanthate solution to coagulation may increase to over two months.

3. Viscose (cellulose xanthate) is a highly hydrated sol in which the liquid surrounding the particles is highly immobilized so that its viscosity is high just after solution (e. g. 2% cellulose concentration). The sol tends to dehydrate on standing thus becoming less viscous. At the lowest viscosity the particles are close together and start to build up a new structure with an increase in viscosity.

4. The viscosity of viscose decreases with increased alkali concentration up to about 8% and then increases slowly. The minimum viscosity and the maximum stability to coagulation both occur at about 8% sodium hydroxide.

5. Decomposition of the xanthate is accelerated at elevated temperatures (e. g. 140° F. or higher).

6. In certain stages of ripening, viscose exhibits the phenomenon of thixotropy.

7. Cellulose xanthate can disperse regenerated cellulose, thus demonstrating its protective colloid function.

8. Electrolytes generally accelerate the coagulation of viscose, but some have the opposite effect, for example, sodium sulfite is a good retarder of coagulation.

Cellulose xanthates have been converted into many derivatives, which derivatives can also be called xanthates because they contain the xanthate linkage:

Many of these derivatives are useful in drilling muds. For example, salts of carboxyalkylcellulose xanthates are useful in drilling mud. A typical example and a quite useful material for such purposes is carboxymethylcellulose xanthate which is considered to have the formula:

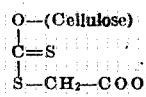

While carboxy methyl, ethyl or propyl cellulose xanthate give the best results, higher hydrocarbon radical carboxy cellulose xanthates have some degree of usefulness.

Carboxymethylcellulose xanthate may be prepared by reacting monochloroacetic acid with a cellulose xanthate.

Reaction products of other aliphatic acids and cellulose xanthate are useful in drilling muds and may be considered to have the general formula:

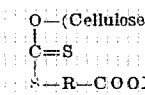

In the above formula X represents an atom of hydrogen or of sodium, potassium, lithium, caesium or rubidium or an ammonium radical and R represents an alkylene radical which may be a methylene or alkyl substituted methylene group or a number of such groups. The specific compounds contemplated are therefore reaction products of cellulose xanthates and halogen substituted aliphatic acids. Alkali salts of these reaction products are useful in drilling muds, for example, the sodium salt of carboxymethylcellulose xanthate is useful. These carboxyalkylcellulose xanthates and their alkali metal salts may be further stabilized by the addition of minor amounts of the above mentioned oxidation inhibitors.

Any use of a soluble cellulose such as the stabilized xanthates and derivatives described herein to be retained as a soluble dispersing agent throughout the entire normal life of the drilling mud is not to be confused with the use of some cellulose which is to be precipitated as an insoluble plugging agent in the formation. Nor is the use of a soluble cellulose which is substantially stable to heat or cold or aging or ripening or dilution by water or dilute salts of connate water to be confused with plugging agents which are deliberately precipitated by such heat or cold or aging or dilution. We do not use our soluble cellulose as a plugging agent at all, and while minor reactions in the well may form a coloidal haze of supposedly insoluble cellulose and while this colloidal cellulose may contact the formation, such minor traces of insoluble colloidal material is not comparable to the immediate precipitation of relatively massive insoluble plugging material. Drilling muds containing such soluble cellulose are not subject to any injury by dilute salts to any detrimental degree in the amount used (which may be about 4 pounds of cellulose per barrel of mud) and in the concentration of salt of usual connate waters.

Such drilling muds containing soluble cellulose as the stable xanthates and derivatives described herein often have low initial gel strength which allows gas bubbles to come out of the drilling mud so rapidly that the drilling mud will not become gas cut. Elimination of gas cutting reduces the chances of blowouts. Such soluble cellulose drilling muds are often characterized by a thin filter cake thickness and by small water loss.

This is very useful in avoiding loss of water to the formation, as well as the resultant swelling or caving of the formation which occurs with some formations. They do not generally ferment or spoil.

It is understood that while a theory of operation has been advanced, it is not the only or necessary one, but has been advanced only to facilitate the disclosure. It is understood, however, that this invention is not limited to any theory of operation or action. It is further obvious that various changes may be made in the details without departing from the spirit of this invention, nor from the scope of the invention as defined in the following claims. Obviously, use in aqueous mud laden fluids includes use in the aqueous phase of an emulsion with non-aqueous material. It is understood the invention is not to be limited to the specific details described. For example, tests with treating and control agents indicate that water soluble celluloses are somewhat inert chemically and that all the normal and usual treating and control agents of the well drilling fluid and well controlling fluid arts may, after a simple test for solubility and lack of obvious adverse reactions, be employed without invention in our cellulose drilling and controlling fluids, and that with few, if any, exceptions they will be so employable. Our invention is, therefore, to be defined by the following claims.

Having described our invention, we claim:

1. A water base well drilling mud comprising in combination sufficient water to maintain the mud as a fluid, sufficient clayey material to form a filter cake on the wall of the well, and a water soluble cellulose xanthate substantially stabilized against coagulation due to usual natural well conditions by the incorporation of an effective amount of a cellulose xanthate-ripening inhibitor, said cellulose xanthate and ripening inhibitor being incorporated in an amount sufficient to reduce the water loss due to filtration through said filter cake without increasing the viscosity of said well drilling mud to such an extent that it cannot be circulated.

2. A water base well drilling mud comprising in combination sufficient water to maintain the mud as a fluid, sufficient clayey material to form a filter cake on the wall of the well, and a water soluble cellulose xanthate selected from the group consisting of carboxyalkylcellulose xanthates and their alkali metal salts which cellulose xanthate is substantially stabilized against coagulation due to usual natural well conditions by the incorporation of an effective amount of a cellulose xanthate-ripening inhibitor, said cellulose xanthate and ripening inhibitor being incorporated in an amount sufficient to reduce the water loss due to filtration through said filter cake without increasing the viscosity of said well drilling mud to such an extent that it cannot be circulated.

3. A water base well drilling mud comprising in combination sufficient water to maintain the mud as a fluid, sufficient clayey material to form a filter cake on the wall of the well, and a water soluble cellulose considered to have the formula:

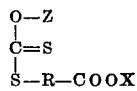

in which Z is the cellulose glucose residue and O—C—S—R—COOX is the functional radical, O being oxygen, C carbon, S sulfur, R an alkylene radical and X being one of the group consisting of hydrogen, sodium, potassium, lithium, and the ammonium radical, which water soluble cellulose is substantially stabilized against coagulation due to usual natural well conditions by the incorporation of an effective amount of a cellulose xanthate-ripening inhibitor, said water soluble cellulose and ripening inhibitor being incorporated in an amount sufficient to reduce the water loss due to filtration through said filter cake without increasing the viscosity of said well drilling mud to such an extent that it cannot be circulated.

4. A water base drilling mud comprising an aqueous fluid mixture containing suspended solids which form a filter cake on the walls of the well, and a water soluble cellulose xanthate substantially stabilized against coagulation due to usual natural well conditions by the incorporation of an effective amount of a cellulose xanthate-ripening inhibitor, said cellulose xanthate and ripening inhibitor being incorporated in an amount sufficient to reduce the water loss due to filtration through said filter cake without increasing the viscosity of said well drilling mud to such an extent that it cannot be circulated.

5. A water base drilling mud comprising an aqueous fluid mixture containing suspended solids which form a filter cake on the walls of the well, and a water soluble cellulose xanthate selected from the group consisting of carboxyalkylcellulose xanthates and their alkali metal salts which cellulose xanthate is substantially stabilized against coagulation due to usual natural well conditions by the incorporation of an effective amount of a cellulose xanthate-ripening inhibitor, said cellulose xanthate and ripening inhibitor being incorporated in an amount sufficient to reduce the water loss due to filtration through said filter cake without increasing the viscosity of said well drilling mud to such an extent that it cannot be circulated.

6. A water base drilling mud comprising an aqueous fluid mixture containing suspended solids which form a filter cake on the walls of the well, and a water soluble cellulose considered to have the formula:

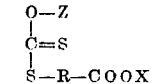

in which Z is the cellulose glucose residue and

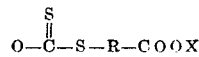

is the functional radical, O being oxygen, C carbon, S sulfur, R an alkylene radical and X being one of the group consisting of hydrogen, sodium, potassium, lithium, and the ammonium radical, which water soluble cellulose is substantially stabilized against coagulation due to usual natural well conditions by the incorporation of an effective amount of a cellulose xanthate-ripening inhibitor, said water soluble cellulose and ripening inhibitor being incorporated in an amount sufficient to reduce the water loss due to filtration through said filter cake without increasing the viscosity of said well drilling mud to such an extent that it cannot be circulated.

CARY R. WAGNER.
WILLIAM N. AXE.

(References on following page)

REFERENCES CITED

The following references are of record in the file of this patent:

UNITED STATES PATENTS

| Number | Name | Date |
|---|---|---|
| 1,674,401 | Lilienfeld | June 19, 1928 |
| 2,129,913 | Cross et al. | Sept. 13, 1938 |
| 2,336,171 | Freeland et al. | Dec. 7, 1943 |
| 2,337,296 | Kennedy et al. | Dec. 21, 1943 |
| 2,364,434 | Foster | Dec. 5, 1944 |
| 2,425,768 | Wagner | Aug. 19, 1947 |

OTHER REFERENCES

Pages 832–833 of Vol. 5 of Ott's "Cellulose High Polymers" (1943), published by Interscience Publishers, Inc. of New York.

Article by Perkins et al. entitled "The Effects of Certain Gums and Starches on Filtration of Salt-Water Muds at Elevated Temperatures," in The Oil Weekly, page 45, Nov. 2, 1942.

Article by Chaney entitled "A Review of Recent Advances in Drilling Mud Control." Pages 25, 26, 28, 32, 34, 36, 40 and 42 of "The Oil Weekly," Nov. 23, 1942.

---

Certificate of Correction

Patent No. 2,523,977                                September 26, 1950

CARY R. WAGNER ET AL.

It is hereby certified that error appears in the printed specification of the above numbered patent requiring correction as follows:

Column 6, line 1, for $$\text{"O—C—S—R—COOX"} \quad \text{read} \quad \text{O}-\overset{\overset{\text{S}}{\|}}{\text{C}}-\text{S}-\text{R}-\text{COOX}$$

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*